US008435069B2

(12) United States Patent
Burke et al.

(10) Patent No.: US 8,435,069 B2
(45) Date of Patent: May 7, 2013

(54) USB CABLE AND METHOD OF PRODUCING SAME

(75) Inventors: Paul C. Burke, Waukegan, IL (US); James L. DuBois, Lockport, IL (US)

(73) Assignee: Telefonix, Inc., Waukegan, IL (US)

( * ) Notice: Subject to any disclaimer, the term of this patent is extended or adjusted under 35 U.S.C. 154(b) by 0 days.

(21) Appl. No.: 13/323,361

(22) Filed: Dec. 12, 2011

(65) Prior Publication Data

US 2012/0149236 A1 Jun. 14, 2012

Related U.S. Application Data

(63) Continuation of application No. 12/798,320, filed on Apr. 1, 2010, now Pat. No. 8,075,335.

(51) Int. Cl.
*H01R 13/72* (2006.01)

(52) U.S. Cl.
USPC ........................................ 439/501; 242/378.1

(58) Field of Classification Search .................. 439/501; 242/378.1–378.4; 191/12.4
See application file for complete search history.

(56) References Cited

U.S. PATENT DOCUMENTS

| | | | | |
|---|---|---|---|---|
| 5,588,626 A * | 12/1996 | Yang | .......................... | 242/378.1 |
| 6,019,304 A * | 2/2000 | Skowronski et al. | ......... | 242/373 |
| 6,056,591 A * | 5/2000 | Liao | .............................. | 439/501 |
| 6,254,025 B1 * | 7/2001 | Liao | ........................... | 242/378.1 |
| 6,305,632 B1 * | 10/2001 | Hwang | ..................... | 242/378.1 |
| 6,337,444 B1 * | 1/2002 | Liao | .............................. | 174/135 |
| 6,371,398 B1 * | 4/2002 | Liao | ........................... | 242/378.1 |
| 6,374,970 B1 * | 4/2002 | Liao | .............................. | 191/12.4 |
| 6,378,797 B1 * | 4/2002 | Liao | ........................... | 242/378.1 |
| 6,397,991 B1 * | 6/2002 | Chang | ......................... | 191/12.4 |
| 6,401,892 B1 * | 6/2002 | Chang | ......................... | 191/12.4 |
| 6,415,898 B1 * | 7/2002 | Liao | .............................. | 191/12.4 |
| 6,416,005 B1 * | 7/2002 | Liao | ........................... | 242/378.1 |
| 6,416,355 B1 * | 7/2002 | Liao | .............................. | 439/501 |
| 6,439,490 B1 * | 8/2002 | Hwang | ..................... | 242/378.1 |
| 6,446,898 B1 * | 9/2002 | Hwang | ..................... | 242/378.1 |
| 6,461,191 B1 * | 10/2002 | Chung | ......................... | 439/501 |
| 6,474,585 B2 * | 11/2002 | Liao | ........................... | 242/378.1 |
| 6,644,582 B1 * | 11/2003 | Liao | ........................... | 242/378.1 |
| 6,682,008 B2 * | 1/2004 | Yeh | ........................... | 242/378.1 |
| 6,736,346 B1 * | 5/2004 | Park | .......................... | 242/378.1 |
| 6,736,661 B2 * | 5/2004 | Homer | ......................... | 439/344 |
| 6,834,820 B2 * | 12/2004 | Wei | ............................... | 242/378 |
| 6,858,951 B2 * | 2/2005 | Liao | .............................. | 290/1 C |
| 6,866,219 B2 * | 3/2005 | Wei | ........................... | 242/378.4 |
| 6,871,812 B1 * | 3/2005 | Chang | ........................ | 242/378.1 |
| 7,086,512 B2 * | 8/2006 | Shack et al. | ................. | 191/12.4 |
| 7,108,216 B2 * | 9/2006 | Burke et al. | ............... | 242/378.1 |
| 7,201,342 B2 * | 4/2007 | Huang | ........................ | 242/378.2 |
| 7,222,812 B2 * | 5/2007 | Chang et al. | ............... | 242/378.1 |
| 7,364,109 B2 * | 4/2008 | Kuo | ........................... | 242/373 |
| 7,384,013 B2 * | 6/2008 | Yen | ............................... | 242/378 |
| 7,389,955 B2 * | 6/2008 | Liao | ........................... | 242/378.1 |
| 7,523,883 B2 * | 4/2009 | Cheng | .......................... | 242/378 |
| 7,604,194 B2 * | 10/2009 | Chang | ........................ | 242/378.1 |
| 7,607,603 B1 * | 10/2009 | Chang | ........................ | 242/378.1 |
| 7,681,822 B2 * | 3/2010 | Tai | ............................. | 242/378.1 |
| 7,681,823 B2 * | 3/2010 | Chang | ........................ | 242/378.1 |

(Continued)

*Primary Examiner* — Ross Gushi
(74) *Attorney, Agent, or Firm* — Niro, Haller & Niro

(57) ABSTRACT

A method and apparatus for producing a USB cable capable of being fed out of and returned to a cable reel is disclosed along with a cable reel that houses the cable and provides connectivity for the cable.

2 Claims, 3 Drawing Sheets

U.S. PATENT DOCUMENTS

| | | | |
|---|---|---|---|
| 7,784,727 B1 * | 8/2010 | Liao | 242/378.1 |
| 7,909,281 B2 * | 3/2011 | Liao | 242/378.1 |
| 2002/0040945 A1 * | 4/2002 | Stepancich et al. | 242/378.1 |
| 2002/0053622 A1 * | 5/2002 | Kagel | 242/379 |
| 2003/0042097 A1 * | 3/2003 | Lee | 191/12 R |
| 2004/0094649 A1 * | 5/2004 | Park | 242/378.1 |
| 2004/0129820 A1 * | 7/2004 | Liao | 242/378.1 |
| 2004/0200920 A1 * | 10/2004 | Wei | 242/378.4 |
| 2005/0194486 A1 * | 9/2005 | Huang | 242/378.4 |
| 2006/0011763 A1 * | 1/2006 | Kuo | 242/378.1 |
| 2006/0102766 A1 * | 5/2006 | Chang et al. | 242/378.1 |
| 2006/0186248 A1 * | 8/2006 | Liao | 242/378 |
| 2006/0261203 A1 * | 11/2006 | Yang | 242/378.4 |
| 2007/0001046 A1 * | 1/2007 | Wu | 242/378.1 |
| 2007/0262185 A1 * | 11/2007 | Burke et al. | 242/370 |
| 2007/0295850 A1 * | 12/2007 | Lin | 242/378.1 |
| 2009/0101743 A1 * | 4/2009 | Chang | 242/385.2 |
| 2009/0166462 A1 * | 7/2009 | Chang | 242/375 |

* cited by examiner

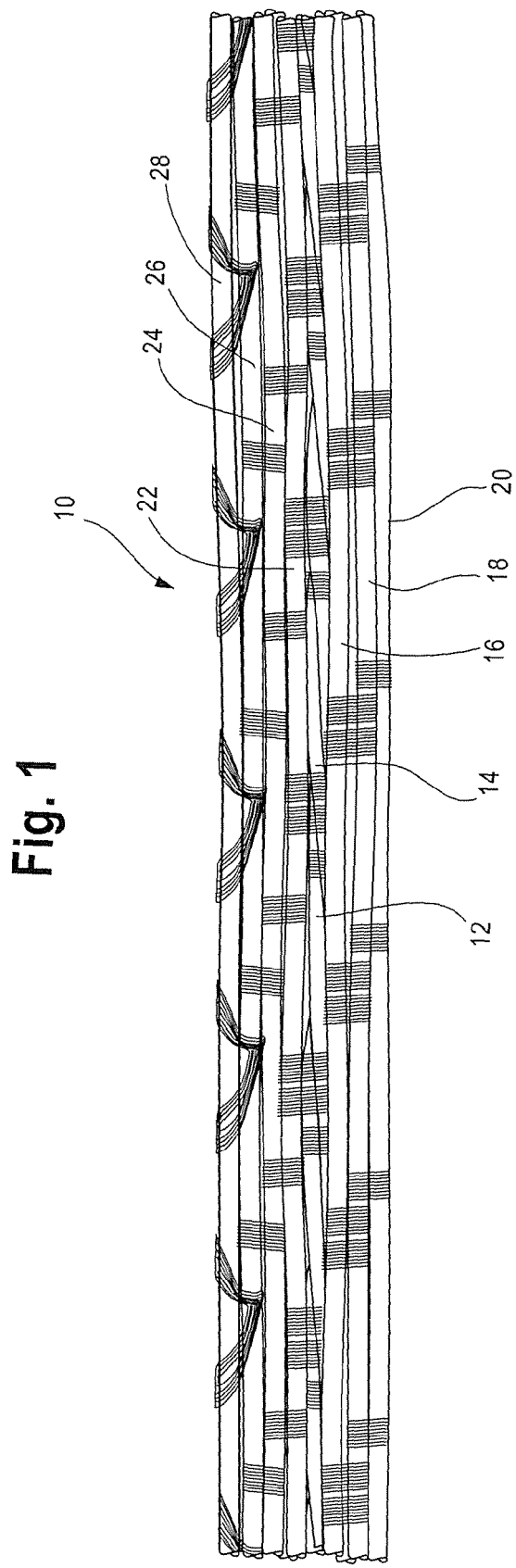

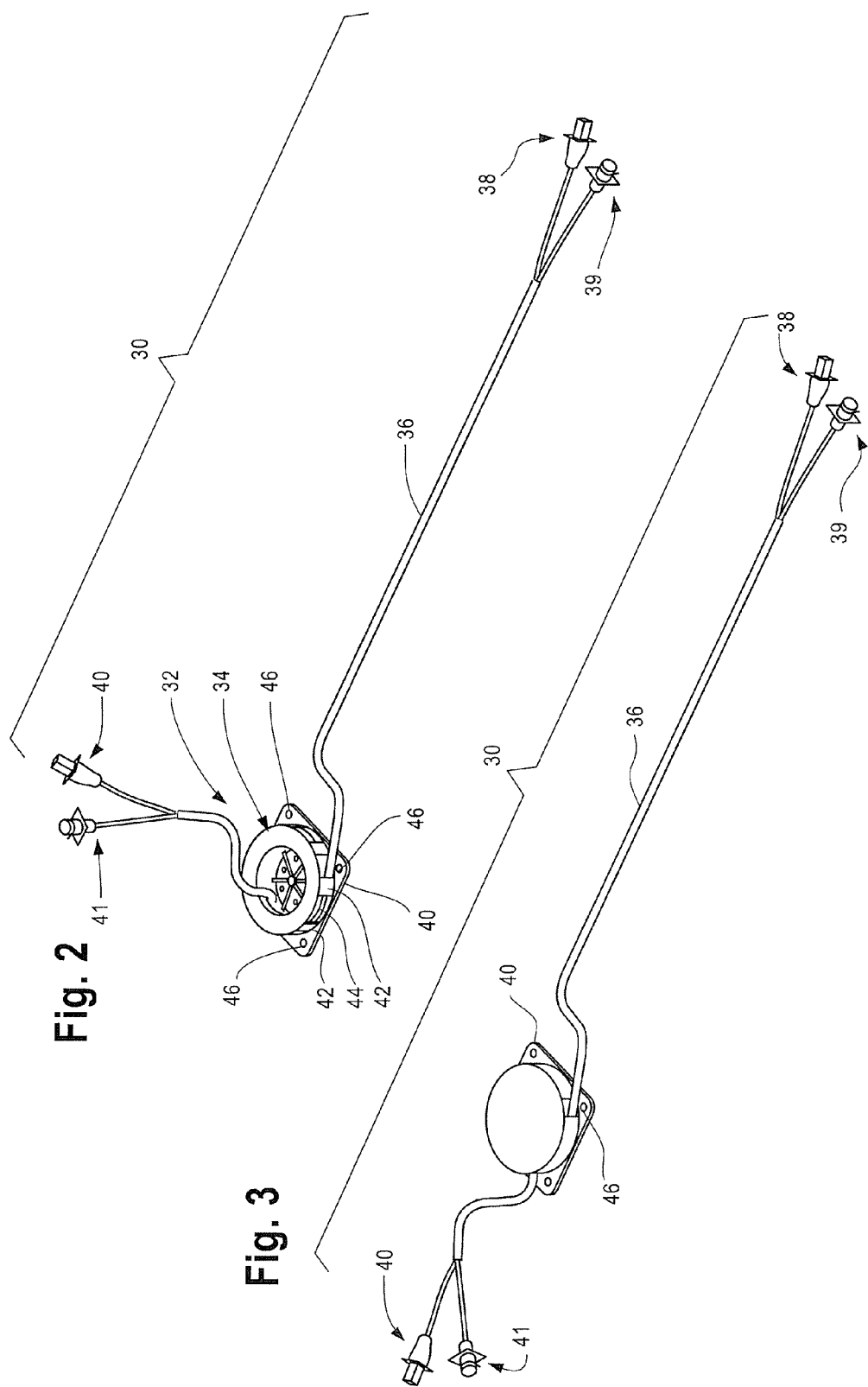

USB CABLE AND METHOD OF PRODUCING SAME

The application claims priority of provisional application 61/166,248 filed on Apr. 3, 2009. The present invention relates generally to a USB cord, and more specifically to a USB cord coupled to a retractable reel.

FIELD OF THE INVENTION

Background of the Invention

Universal Serial Bus, or "USB" is a commonly used term that refers to a standard for connecting two electronic devices or for connecting a device and a host computer. Using USB technology, a plurality of peripherals can be connected using a single standardized interface socket. Plug-and-play capabilities may also be improved by permitting hot swapping—that is, by permitting devices to be connected and disconnected without rebooting the computer or turning off the device. Other features of USB technology include providing power to low-consumption devices, eliminating the need for an external power supply, and allowing many devices to be used without requiring manufacturer-specific device drivers to be installed.

In certain scenarios, it may be desirable to have a USB cord on a retractable reel, such that the cord can be extended and retracted into a reel depending on how and when it is being used.

SUMMARY OF THE INVENTION

The present invention relates to one or more of the following features, elements or combinations thereof.

In one embodiment, a retractable USB reel includes a pair of data wires placed next to each other and overlaid with an EMI/RFI shield. The data wires may be twisted around each other. Conductors can also be placed and twisted around the data wires or put in parallel relationship with the data wires. The resulting conglomerate of wires and shields can then be covered with a low friction substance and then an EMI/RFI shield.

In another embodiment, a cord reel is provided with an electrically conductive material. The cord reel is configured to carry a stationary USB coil and a movable USB coil, such that the two USB coils are in communication with each other.

BRIEF DESCRIPTION OF THE DRAWINGS

FIG. 1 is a top view of a flat USB connecting cable according to one embodiment of the invention;

FIG. 2 is a perspective view of a USB cord reel according to one embodiment of the invention, the USB cord reel showing the inner elements of the cord reel;

FIG. 3 is a perspective view of a USB cord reel; and

DETAILED DESCRIPTION OF EMBODIMENTS OF THE INVENTION

Figure 4:
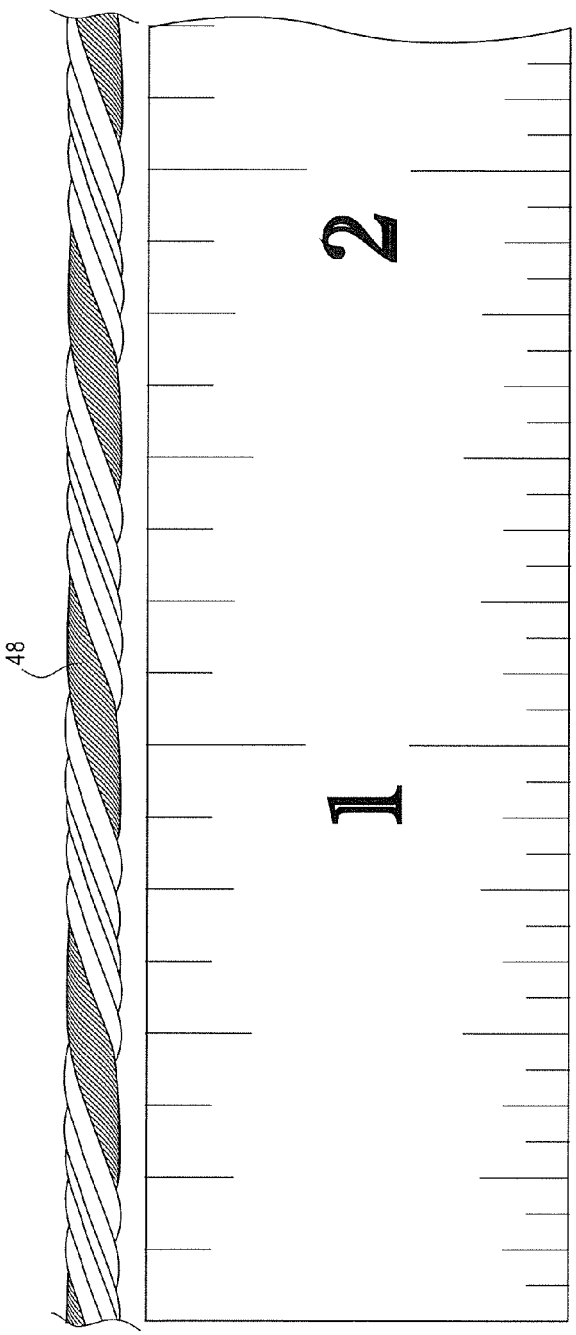
FIG. 4 is a perspective view of one embodiment of the invention without a jacket.

As can be seen in FIG. 1, a flat USB cable 10 can include a first data wire 12 and a second data wire 14. First and second data wires 12, 14 are illustratively positioned adjacent to each other and twisted around each other. Other wires 16, 18, 20, 22, 24, 26, and 28 may also be positioned alongside first and second data wires 12, 14. In the illustrated example, other wires 16, 18, 20, 22, 24, 26 and 28 are arranged in a substantially parallel single row on either or both sides of first and second data wires 12, 14. The various wires 12, 14, 16, 18, 20, 22, 24, 26, and 28 are held together with a threaded material.

The present invention comprises a cable management system for organizing and managing a USB cable, and may optionally comprise other cables and/or wires coupled therewith. Such a management system facilitates the use and storage of a USB cord in a variety of environments, including passenger vehicles.

As can be seen in FIG. 2, the illustrative cable management system 30 comprises a cable storage unit 32, a cable reel 34, a cable 36, and a USB connector 38. A second USB connector or other electronic connector 40 may also be provided at the other end of cable management system 30. Additional connectors 39, 41 may also be provided. The cable storage unit 32 may have a tension element disposed within and coupled to reel 34, the tension element functioning to resist extraction of the cable 36 from the housing.

The cable storage unit 32 may be configured for mounting on a seat, a vehicle, or any other type of structure. Similar disclosures of cable storage units and cable management systems can be found in U.S. Pat. No. 5,094,396 to Burke, the subject matter of which is hereby incorporated by reference, and U.S. Patent Application No. 2007/0262185 to Burke, the subject matter of which is also hereby incorporated by reference.

In the embodiment shown in FIGS. 2-3, cable storage unit 32 includes a spool or reel 34 upon which a portion of the length of the cable 36 is wound. The cable storage unit 32 also includes a base or housing 40. The housing 40 may include a plurality of circumferentially spaced tabs 42 configured to enable reel 34 to be rotatable relative to housing 40. Additionally, tabs 42 may be configured to retain the wound portion 44 of the cable against reel 34. The inside surface of housing 40 may also be coated with an electrically conductive coating.

Housing 40 may also provide mounting holes 46 to facilitate mounting of the cable storage unit 32 underneath a passenger seat or in some other location. It should be understood that cable 36 may include multiple types of wires and/or connectors. For example, in the embodiments shown in FIGS. 2-3, two connectors 38, 39 and 40, 41 appear at each end of the cable management system 30.

The manufacture and construction of cable 36 is illustratively as follows and can be seen in FIG. 4. A pair of USB data wires is placed next to each other in such a way as to remain substantially immobile relative to each other. For example, it is contemplated that the USB data wires are twisted around each other at a rate of approximately four twists per inch. The USB data wires can then be overlaid with a braided shield 48. Shield 48 functions to substantially remove void spaces between the data wires and may further assist in protecting the USB data wires from interference from any adjoining wires and appliances. In one embodiment, the shield is a helically braided, served shield. Collectively, the USB data wires and the shield are referred to herein as a "first construe."

Additional conductors/data wires are placed in close spatial relationship to the first construct to create a second construct having a cross section defining a substantially circular periphery. The additional conductors may be twisted or fluted helically about the first construct at a lay rate of two twists per inch. Alternatively, the additional conductors may be positioned alongside and parallel to the first construct, without twisting around the first construct. If desirable, "core fillers" may also be used to create a cord that is substantially round in construction. This "second construct" will ideally be formed to have a bend radius of 55 mm or greater.

The second construct is then covered with a low friction substance such as PFE, followed by second shield, such as an EMI/RFI shield. This process can ideally produce a USB cable with a bend radius of 55 mm or greater, a length of at least five meters, and a signal rate of at least 1.5 Mb.

It is also of interest to provide a USB cord that has sufficient impedance for the operation of electronic devices and data components. A suggested nominal impedance for most data applications is 90 Ohms. Accordingly, one of the goals of the disclosed embodiment is to manufacture a USB cord that allows for approximately the illustrative 90 Ohms impedance.

It is observed that impedance is affected by physical and geometric properties of the wires and the constructs. The spacing between the wires, as well as the wall thickness of the wire insulation is significant. Bending the wires also affects impedance. Accordingly, it is significant to hold the USB data wires in a substantially uniform manner regardless of how the USB cord is positioned or bent.

Additional conductors/wires that are positioned along the USB wires can also affect impedance. Therefore, the position of such additional conductors and the shield between the conductors and the USB wires are considerations when constructing the USB cord. An additional shield around the non-USB conductors may also be desirable. Finally, a braided nylon jacket may be formed on top of entire bundle. This nylon jacket may affect impedance by putting pressure on the underlying data wires. Furthermore, in a "double served shield" embodiment, impedance may also be affected.

The following chart shows various impedances and the resulting decline in impedances in selected "P3" embodiments. The term "no jacket" means no nylon jacket was used. The term "jacket" refers to a nylon-braided jacket. Single serve and double serve refer to the number of shields around the constructs inside the cord.

|  | No Jacket |  | w/Jacket | 90Ω diff. |
|---|---|---|---|---|
| P3 Core Shield | 96Ω → |  | 88.4Ω → | 1.6Ω |
|  | ↓ | 7.6Ω |  |  |
| P3 Core Shield + | 3.3Ω |  |  |  |
| Single Serv | 92.7Ω → |  | 87.6Ω → | 2.4Ω |
|  | ↓ | 5.1Ω |  |  |
| P3 core Shield + | 8.1Ω |  |  |  |
| Double Serv | 84.6Ω → |  | 82Ω → | 8Ω |
|  |  | 2.6Ω |  |  |

From the data shown above, it can be seen that a data wire with higher impedance must be used in order to result in a 90 Ohm impedance. Additional notes relating to the construction of the USB cord can be found in Exhibit A, attached hereto and incorporated by reference.

While the disclosure is susceptible to various modifications and alternative forms, specific exemplary embodiments thereof have been shown by way of example in the drawings and have herein been described in detail. It should be understood, however, that there is not intent to limit the disclosure to the particular embodiments disclosed, but on the contrary, the intention is to cover all modifications, equivalents, and alternatives falling within the spirit and scope of the disclosure.

We claim:

1. A universal serial bus cord reel apparatus comprising:

A cable, the cable comprising a) first and second data wires adjacent to each other, and twisted around each other at approximately four twists per inch; b) a first braided shield surrounding the first and second data wires to prevent electromagnetic or radio frequency interference; c) two or more additional conductors adjacent to the shield surrounding the first and second data wires, the additional wires being twisted about the shield at approximately two twists per inch; d) an electrical insulator cover enclosing the additional conductors and first and second data wires; and e) a second shield enclosing the electrical insulator cover; whereby the cable has an impedance of approximately 90 ohms;

a universal serial bus connector at each end of the cable;

a housing;

a reel attached to and rotatable with respect to the housing for accepting the cable;

a ratchet attached to the housing for selectively restraining rotation of the reel whereby the cable may be maintained in an extended position, or retracted and wound on the reel.

2. A universal serial bus cord reel apparatus comprising:

A cable, the cable comprising a) first and second data wires adjacent to each other, and twisted around each other at approximately four twists per inch; b) two or more additional conductors adjacent to the shield surrounding the first and second data wires, the additional wires being twisted about the shield at approximately two twists per inch; c) an electrical insulator cover enclosing the additional conductors and first and second data wires; and d) a second shield enclosing the electrical insulator cover; whereby the cable has an impedance of approximately 90 ohms;

a universal serial bus connector at each end of the cable;

a housing;

a reel attached to and rotatable with respect to the housing for accepting the cable;

a ratchet attached to the housing for selectively restraining rotation of the reel whereby the cable may be maintained in an extended position, or retracted and wound on the reel.

* * * * *